(No Model.)
D. E. BAKER.
CULTIVATOR ATTACHMENT.
No. 530,819. Patented Dec. 11, 1894.
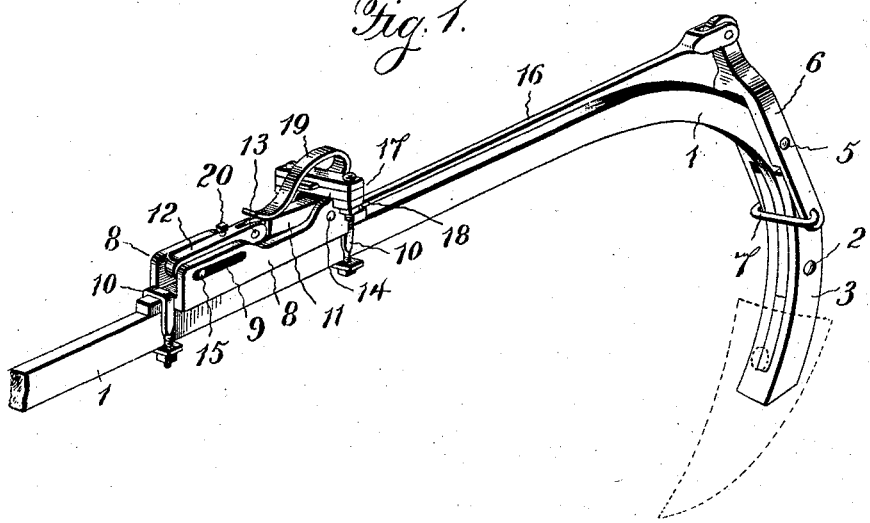
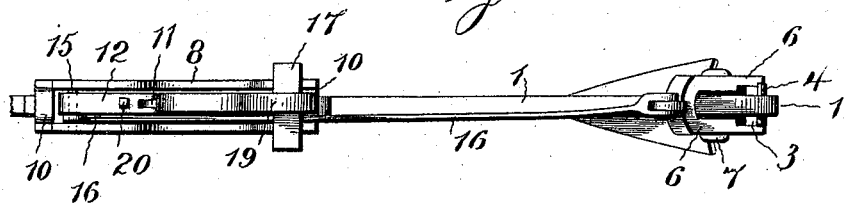
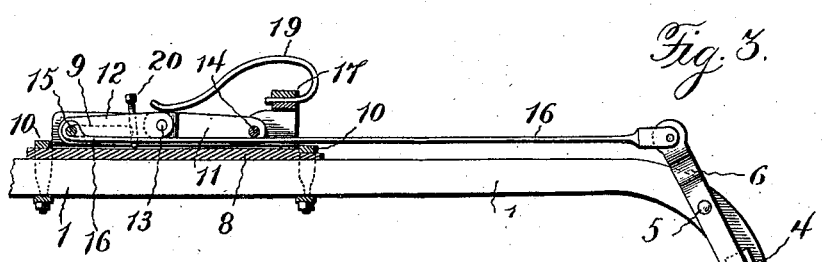
Witnesses:
Jas. E. Hutchinson.
A. H. Norris.
Inventor.
Dilver E. Baker,
James L. Norris.
By
Attorney.

UNITED STATES PATENT OFFICE.

DILVER E. BAKER, OF COWGILL, MISSOURI.

CULTIVATOR ATTACHMENT.

SPECIFICATION forming part of Letters Patent No. 530,819, dated December 11, 1894.

Application filed August 30, 1894. Serial No. 521,747. (No model.)

*To all whom it may concern:*

Be it known that I, DILVER E. BAKER, a citizen of the United States, residing at Cowgill, in the county of Caldwell and State of Missouri, have invented new and useful Improvements in Cultivator Attachments, of which the following is a specification.

This invention relates to cultivator attachments and has for its object to provide simple and reliable means for permitting the shovels, points or shares of cultivators to yield without break or injury, when in contact with immovable obstructions, and then cause the same to resume a normal operative position after the obstruction has passed and without involving any delay in the forward movement of the implement.

The invention consists in the features of construction and in the novel combination and relative arrangement of parts in a mechanism for automatically controlling the position of cultivator points, to avoid injury from obstacles, as hereinafter more particularly set forth.

In the annexed drawings, illustrating the invention—Figure 1 is a perspective of a cultivator beam provided with my improved attachment. Fig. 2 is a plan of the same. Fig. 3 is a partial longitudinal section of the cultivator attachment in position on the beam.

Referring to the drawings, the numeral 1 designates one of the beams of a cultivator. As usual, the rear portion of the beam 1 is bent downwardly and to its rear end is attached, by a pivot pin or bolt 2, the yielding shank 3 to which the shovel, share or other cultivator-point is secured. The upper end of the shank 3 is preferably bifurcated, as shown, to embrace the rear portion of the beam; and a stop 4 may be provided on each side of the beam to limit the rearward movement of the upper portion of the shank and assist in holding it in proper operative relation with the beam.

Mounted on the rear upper portion of the beam 1, by means of a pivot 5, is a yoke 6 the lower end of which is provided with a cross bar or bail 7 arranged in front of the rear downwardly curved portion of the beam. In the normal position of the pivotally supported yoke 6 its upper end is inclined forward and its lower end is inclined rearward so that the cross bar or bail 7 will press against the upper front portion of the shank 3, above its pivot 2, and thereby hold the shank and attached shovel, or point in proper operative position with relation to the cultivator beam.

Upon the front portion of the cultivator beam 1 is secured a, preferably, metallic frame or box 8 having longitudinal slots 9 in the forward ends of its two parallel sides. By means of clamps 10, at its ends, the box or frame 8 may be detachably secured to the beam 1 so as to be capable of ready removal at any time. In the box or frame 8 is supported a toggle-trip mechanism composed of the two levers or links 11 and 12 connected by a pivotal joint 13, as shown. The rear end of the lever 11 is connected by a pivot 14 with the rear portion of the frame 8 and the forward end of the lever 12 is provided on opposite sides with guide pins 15 engaged in the guide slot 9 of the frame. A rod 16 is arranged to connect the upper end of the pivoted yoke 6 with a guide pin 15 on the forward end of the lever 12 of the trip mechanism. It will be observed that the top of the box or frame 8 is open to afford space for the working of the toggle levers.

On the rear end of the open top box or frame 8 is supported a transversely arranged bar or block 17 that may be secured by bolts passed through ears or lugs 18 on the opposite sides of the said box or frame. A spring 19 has one end secured to and coiled once around the block or bar 17 and its other end arranged to bear down onto the top of the rearmost lever 11 of the toggle-trip mechanism. One of the levers 11 or 12 may carry a downward projecting set screw 20 that is normally in contact with the bottom of the box or frame and can be raised or lowered to limit the extension of the toggle levers, as required.

When the attachment is in its normal position the toggle-levers 11 and 12 are more or less extended and are held down by the tension of the spring 19 as far as the adjustment of the set screw 20 will allow. In this extended or approximately horizontal position of the toggle levers 11 and 12 the rod 16 is drawn forward, thereby drawing forward, also, the upper end of the pivoted yoke 6 so as to cause the cross bar or bail 7 at its lower end to bear or press backward against the front upper portion of the shank 3, above its pivot 2 and thus hold the shank and attached shovel or cultivator rigid and in proper coincidence with the curved rear portion of the beam.

It will be understood, of course, that the strength or tension of the spring 19 is such as will hold the toggle levers 11 and 12 down and maintain the normal operative position of the point-shank 3 under ordinary conditions of cultivator work and at the usual depth for plowing. Should, however, the cultivator point meet with any obstruction or come in contact with any hard and immovable substance, as a rock or stump, the spring 19 will allow the toggle-levers 11 and 12 to rise under the increased strain exerted on the cultivator point, the cross bar or bail 7 of the pivoted yoke 6 will no longer restrain the shank 3 and, thus, the cultivator point and shank will readily yield backward without subjecting the point, the shank or the beam to any liability of breakage or other damage. In the backward yielding of the cultivator point the upper end of its shank 3 moves forward and springs the yoke 6 on its pivot so as to draw on the rod 16 and flex or raise the toggle levers 11 and 12 against the tension of the spring 19; but as soon as the obstacle is passed the spring 19 will again force down the toggle mechanism, to the limit of extension permitted by the adjustment given to the set screw 20, and the rod 16 will be thus drawn forward in such manner as to cause the lower end of the yoke 6 to spring backward and immediately restore the cultivator point to its normal operative position. All delays in the operation of the cultivator are thus avoided, it will not be necessary to stop work for renewal of the ordinary break pins, and the cultivator may be readily maintained in good operative condition without requiring the exercise of unusual care to avoid obstructions.

By means of the set screw 20 the toggle levers can be quickly adjusted to operate at any required strain, so that when the cultivator strikes against an obstruction the shank 3 will yield with such promptness as to avoid any damage, after which, under the tension of the spring 19 it will at once resume its former position without involving any delay in the work of the implement.

The various parts of the attachment are simple in form and arrangement and can be cheaply made of iron or steel, as preferred.

The attachment can be readily placed on any cultivator beam of usual construction and without requiring any change in the beam or cultivators. It is so light that it adds but little weight to the plow and this is nearly all on the wheels. By placing the attachment mostly on the forward portion of the beam there is nothing at the rear that can become clogged or obstructed by stalks or trash. Although I have shown only one cultivator beam in the drawings I would have it understood that the attachment may be placed on each beam in a gang so that each point or shovel will have a proper and safe yielding operation independent of the others.

What I claim as my invention is—

1. The combination with a cultivator beam provided with a pivoted point-shank, and a yoke pivoted on the beam and having its lower end portion adapted to bear rearwardly against the upper front portion of the point shank above its pivot, of toggle levers mounted on the forward portion of the beam, a rod connecting the front end of the forward toggle lever with the upper end of said pivoted yoke, and a spring arranged above and bearing on the rear toggle lever, substantially as described.

2. The combination with a cultivator beam, a yielding point shank and a yoke pivoted on the beam and provided at its lower end with a cross bar or bail adapted to bear rearwardly against the upper front portion of the point shank above its pivot, of a frame mounted on the forward portion of the beam and provided in its opposite sides with longitudinal slots, toggle levers mounted in said frame and pivoted thereto at one end and provided at the other end with pins engaged in the slots of the frame, a rod connecting one of said pins with the upper end of the pivoted yoke, and a spring arranged above and bearing on one of the toggle levers, substantially as described.

3. The combination with the cultivator beam 1 and yielding point-shank 3, of the pivoted yoke 6 provided with cross bar 7, the frame 8 mounted on the forward portion of the beam and provided with slots 9, the toggle levers 11 and 12 mounted in said frame and provided with pins 15 engaging the slots 9, the rod 16 connecting the toggle levers and the yoke, the spring 19 above the toggle levers, and the set screw 20 adjustable in one of said toggle levers, substantially as described.

In testimony whereof I have hereunto set my hand and affixed my seal in presence of two subscribing witnesses.

DILVER E. BAKER. [L. S.]

Witnesses:
CHARLIE A. FRAZER,
CAREY B. HILL.